United States Patent
Ammanamanchi et al.

(10) Patent No.: US 12,280,684 B2
(45) Date of Patent: Apr. 22, 2025

(54) SYSTEMS AND METHODS FOR UNIVERSAL INPUT POWER SUPPLY BI-DIRECTIONAL BATTERY CHARGER

(71) Applicant: BorgWarner Luxembourg Automotive Systems SA, Bascharage (LU)

(72) Inventors: Venkata Jaya Sai Praneeth Ammanamanchi, Lamadelaine (LU); Alexandre M. S. Reis, Westfield, IN (US)

(73) Assignee: BorgWarner Luxembourg Automotive Systems SA, Bascharage (LU)

( * ) Notice: Subject to any disclaimer, the term of this patent is extended or adjusted under 35 U.S.C. 154(b) by 742 days.

(21) Appl. No.: 17/648,369

(22) Filed: Jan. 19, 2022

(65) Prior Publication Data
US 2023/0231470 A1 Jul. 20, 2023

(51) Int. Cl.
*B60L 53/22* (2019.01)
*H02J 7/06* (2006.01)
*H02M 1/42* (2007.01)
*H02M 3/335* (2006.01)

(52) U.S. Cl.
CPC .......... *B60L 53/22* (2019.02); *H02J 7/06* (2013.01); *H02M 1/4233* (2013.01); *H02M 3/33573* (2021.05); *H02M 3/33584* (2013.01); *B60L 2210/30* (2013.01); *H02J 2207/20* (2020.01); *H02J 2310/48* (2020.01)

(58) Field of Classification Search
CPC ..................................................... B60L 53/22
USPC ............................................... 320/128
See application file for complete search history.

(56) References Cited

U.S. PATENT DOCUMENTS

| 8,395,910 B2* | 3/2013 | Alexander | H02M 5/225 363/142 |
| 2021/0288575 A1* | 9/2021 | Liu | H02M 1/4233 |
| 2021/0296982 A1 | 9/2021 | Hafezinasab et al. | |

FOREIGN PATENT DOCUMENTS

| CN | 111049402 A | 4/2020 |
| EP | 3621174 A1 | 3/2020 |
| EP | 3648322 A1 | 5/2020 |
| EP | 3554887 B1 | 9/2020 |

(Continued)

OTHER PUBLICATIONS

Gong et al., Designing 6.6kW Bidirectional HEV/EV On-Board-Charger with SiC and Embedded Technologies, Texas Instruments (2019).

(Continued)

*Primary Examiner* — Jerry D Robbins
(74) *Attorney, Agent, or Firm* — Joshua M. Haines; Bookoff McAndrews, PLLC (57) ABSTRACT

A system for an AC to DC PFC converter includes a first phase switch group connected to a first node to receive power from a first phase of a voltage source; a second phase switch group connected to a second node to receive power from a second phase of the voltage source; a third phase switch group connected to a third node to receive power from a third phase of the voltage source; a neutral phase switch group connected to a fourth node to be connected to a ground terminal of the voltage source; a first switch connected to the first node and the second node; and a second switch connected to the second node and the third node.

19 Claims, 9 Drawing Sheets

(56) References Cited

FOREIGN PATENT DOCUMENTS

| | | |
|---|---|---|
| EP | 3886304 A1 | 9/2021 |
| WO | 2021208274 A1 | 10/2021 |

OTHER PUBLICATIONS

Hamidreza Hafezinasab, "Investigation of Solutions for Universal Input 208 V-480 V Three-Phase AC/DC Power Factor Corrected Converters with 400 V DC Output", Thesis submitted to the University of British Columbia (Jul. 2020).

K. Stengert, "On-board 22 KW fast charger "NLG6"," 2013 World Electric Vehicle Symposium and Exhibition (EVS27), 2013, pp. 1-11.

Lohrmann et al., "A closer look at on-board charger design for EVs," https://www.edn.com/a-closer-look-at-on-board-charger-design-for-evs/ (Jun. 1, 2021).

\* cited by examiner

SYSTEMS AND METHODS FOR UNIVERSAL INPUT POWER SUPPLY BI-DIRECTIONAL BATTERY CHARGER

TECHNICAL FIELD

Various embodiments of the present disclosure relate generally to a system for an alternating current (AC) to direct current (DC) Power Factor Correction (PFC) converter and, more particularly, to a universal input power supply based bi-directional onboard battery charger for electric vehicles.

BACKGROUND

In the field of battery chargers, a two-stage layout is generally used to meet a requirement for use in automotive vehicles as an onboard charger. These onboard chargers have high power density, with less weight and require less space. The configuration layout used in single-phase or three-phase chargers include an AC-DC PFC converter at stage I and an isolated DC-DC converter at stage II. Most of the chargers available today can operate with either a single-phase, two-phase (when one phase is off), or a three-phase power supply, but are not compatible with multiple power supplies while maintaining a low component count. A few chargers are compatible for single and three phase input power supply, but have limitations on the voltage range levels at the input and output side. For an 800 volt system, a converter should possess flexible charging options with an available single phase, two phase, or three phase supply to extract the available maximum power from the power supply. Conventional onboard chargers are not equipped to provide a wide output range for a wide range of applicable input voltages, while maintaining a low component count.

The present disclosure is directed to overcoming one or more of these above-referenced challenges.

SUMMARY OF THE DISCLOSURE

In some aspects, the techniques described herein relate to a system for an alternating current (AC) to direct current (DC) Power Factor Correction (PFC) converter, the system including: a first phase switch group connected to a first node to receive power from a first phase of a voltage source; a second phase switch group connected to a second node to receive power from a second phase of the voltage source; a third phase switch group connected to a third node to receive power from a third phase of the voltage source; a neutral phase switch group connected to a fourth node to be connected to a ground terminal of the voltage source; a first switch connected to the first node and the second node; and a second switch connected to the second node and the third node.

In some aspects, the techniques described herein relate to a system, further including: an input voltage sensor configured to sense a voltage of each phase of the voltage source; and a controller configured to: based on the sensed voltage, determine a phase of the voltage source, and based on the determined phase of the voltage source, control an operation of the first, second, third, and neutral phase switch groups and an operation of the first and second switches.

In some aspects, the techniques described herein relate to a system, wherein when the determined phase of the voltage source is three phase voltage, the controller is configured to: control the operation of the first, second, and third phase switch groups to output a DC voltage, control the operation of the neutral phase switch group to be open, and control the operation of the first and second switch to be open.

In some aspects, the techniques described herein relate to a system, wherein when the determined phase of the voltage source is two phase voltage, the controller is configured to: control the operation of the first, second, and third phase switch groups to output a DC voltage, control the operation of the neutral phase switch group to be open, and control the operation of the first switch to be open and the second switch to be closed, or control the operation of the first, second, and third phase switch groups to output a DC voltage, control the operation of the neutral phase switch group to be closed, and control the operation of the first switch to be closed and the second switch to be closed.

In some aspects, the techniques described herein relate to a system, wherein when the determined phase of the voltage source is single phase voltage, the controller is configured to: control the operation of the first, second, third, and neutral phase switch groups to output a DC voltage, and control the operation of the first and second switch to form an interleaved converter.

In some aspects, the techniques described herein relate to a system, wherein the controller is configured to: control the operation of an upper switch of each of the first, second, and third phase switch groups based on 120 degree displaced switching pulses, and based on a frequency of the voltage source, operate upper and lower switches of the neutral phase switch group on and off as a return path for current to the voltage source.

In some aspects, the techniques described herein relate to a system, wherein the controller is configured to control the operation of the first and second switches according to one or more of: turning the first switch off and the second switch off for ⅓ power, turning the first switch on and the second switch off for ⅔ power, or turning the first switch on and the second switch on for full power.

In some aspects, the techniques described herein relate to a system, further including an LLC converter connected to outputs of the first, second, third, and neutral phase switch groups.

In some aspects, the techniques described herein relate to a system, further including a DC link capacitor provided in parallel with the first, second, third, and neutral phase switch groups and the LLC converter.

In some aspects, the techniques described herein relate to a system, wherein the PFC converter is configured to output DC power from approximately 300V to approximately 900V.

In some aspects, the techniques described herein relate to a system, further including: the voltage source connected to one or more of the first, second, third, and fourth nodes of the PFC converter; and a battery connected to an output of the LLC converter.

In some aspects, the techniques described herein relate to a system, wherein the PFC converter is further configured to receive DC power from the battery through the LLC converter, convert the DC power to AC power, and provide the AC power through one or more of the first, second, third, and fourth nodes.

In some aspects, the techniques described herein relate to a system, further including a controller configured to: based on a requested voltage phase, control an operation of the first, second, third, and neutral phase switch groups and an operation of the first and second switches to provide the AC power through the one or more of the first, second, third, and fourth nodes.

In some aspects, the techniques described herein relate to a system, wherein the requested voltage phase includes single-phase, two-phase, and three-phase operation.

In some aspects, the techniques described herein relate to a method for controlling a system including an alternating current (AC) to direct current (DC) Power Factor Correction (PFC) converter including first, second, third, and neutral phase switch groups and first and second input switches configured to switch power to the first, second, and third switch groups, the method including performing, by at least one processor, operations including: determining a phase of a voltage source based on a sensed voltage from the voltage source; and based on the determined phase of the voltage source, controlling a switching operation of the first, second, third, and neutral phase switch groups and the first and second input switches of the PFC converter.

In some aspects, the techniques described herein relate to a method, wherein when the determined phase of the voltage source is three phase voltage, the controlling the switching operation includes: controlling the operation of the first, second, and third phase switch groups to output a DC voltage, controlling the operation of the neutral phase switch group to be open, and controlling the operation of the first and second switch to be open.

In some aspects, the techniques described herein relate to a method, wherein when the determined phase of the voltage source is two phase voltage, the controlling the switching operation includes: controlling the operation of the first, second, and third phase switch groups to output a DC voltage, controlling the operation of the neutral phase switch group to be open, and controlling the operation of the first switch to be open and the second switch to be closed, or controlling the operation of the first, second, and third phase switch groups to output a DC voltage, controlling the operation of the neutral phase switch group to be closed, and controlling the operation of the first switch to be closed and the second switch to be closed.

In some aspects, the techniques described herein relate to a method, wherein when the determined phase of the voltage source is single phase voltage, the controlling the switching operation includes: controlling the operation of the first, second, third, and neutral phase switch groups to output a DC voltage, and controlling the operation of the first and second switch to be form an interleaved converter.

In some aspects, the techniques described herein relate to a method, wherein the controlling the switching operation further includes: controlling the operation of an upper switch of each of the first, second, and third phase switch groups based on 120 degree displaced switching pulses, and based on a frequency of the voltage source, operate upper and lower switches of the neutral phase switch group on and off as a return path for current to the voltage source.

In some aspects, the techniques described herein relate to a non-transitory computer readable medium storing instructions that, when executed by at least one processor, perform operations including: determining a phase of a voltage source based on a sensed voltage from the voltage source; and based on the determined phase of the voltage source, controlling a switching operation of first, second, third, and neutral phase switch groups of an alternating current (AC) to direct current (DC) Power Factor Correction (PFC) converter and first and second input switches of the PFC converter configured to switch power to the first, second, and third switch groups.

Additional objects and advantages of the disclosed embodiments will be set forth in part in the description that follows, and in part will be apparent from the description, or may be learned by practice of the disclosed embodiments. The objects and advantages of the disclosed embodiments will be realized and attained by means of the elements and combinations particularly pointed out in the appended claims. As will be apparent from the embodiments below, an advantage to at least some of the disclosed systems and methods is a bidirectional charger that can operate with any of a single-phase, two-phase (when one phase is off), or a three-phase power supply. The disclosed systems and methods discussed below may provide a wide output range for a wide range of applicable input voltages, while maintaining a low component count.

It is to be understood that both the foregoing general description and the following detailed description are exemplary and explanatory only and are not restrictive of the disclosed embodiments, as claimed.

BRIEF DESCRIPTION OF THE DRAWINGS

The accompanying drawings, which are incorporated in and constitute a part of this specification, illustrate various exemplary embodiments and together with the description, serve to explain the principles of the disclosed embodiments.

DETAILED DESCRIPTION OF EMBODIMENTS

Both the foregoing general description and the following detailed description are exemplary and explanatory only and are not restrictive of the features, as claimed. As used herein, the terms "comprises," "comprising," "has," "having," "includes," "including," or other variations thereof, are intended to cover a non-exclusive inclusion such that a process, method, article, or apparatus that comprises a list of elements does not include only those elements, but may include other elements not expressly listed or inherent to such a process, method, article, or apparatus. In this disclosure, unless stated otherwise, relative terms, such as, for example, "about," "substantially," and "approximately" are used to indicate a possible variation of ±10% in the stated value. In this disclosure, unless stated otherwise, any numeric value may include a possible variation of ±10% in the stated value.

Various embodiments of the present disclosure relate generally to an alternating current (AC) to direct current (DC) Power Factor Correction (PFC) converter and, more particularly, to a universal input power supply based bi-directional onboard battery charger for electric vehicles.

The terminology used below may be interpreted in its broadest reasonable manner, even though it is being used in conjunction with a detailed description of certain specific examples of the present disclosure. Indeed, certain terms may even be emphasized below; however, any terminology intended to be interpreted in any restricted manner will be overtly and specifically defined as such in this Detailed Description section.

A converter according to the disclosure may operate with multiple types of AC input power supplies, including single phase, split/dual/two phase, and three-phase power supplies. The charger may use fewer components, while being more compatible with a wide range of operation. The algorithms may ensure the operation of the converter with the various input power supplies with wide variations in input voltages to generate a wide range of output voltages. An LLC converter may be used as a second stage converter using a DC link voltage generated from PFC as the input voltage for the converter.

Figure 2:
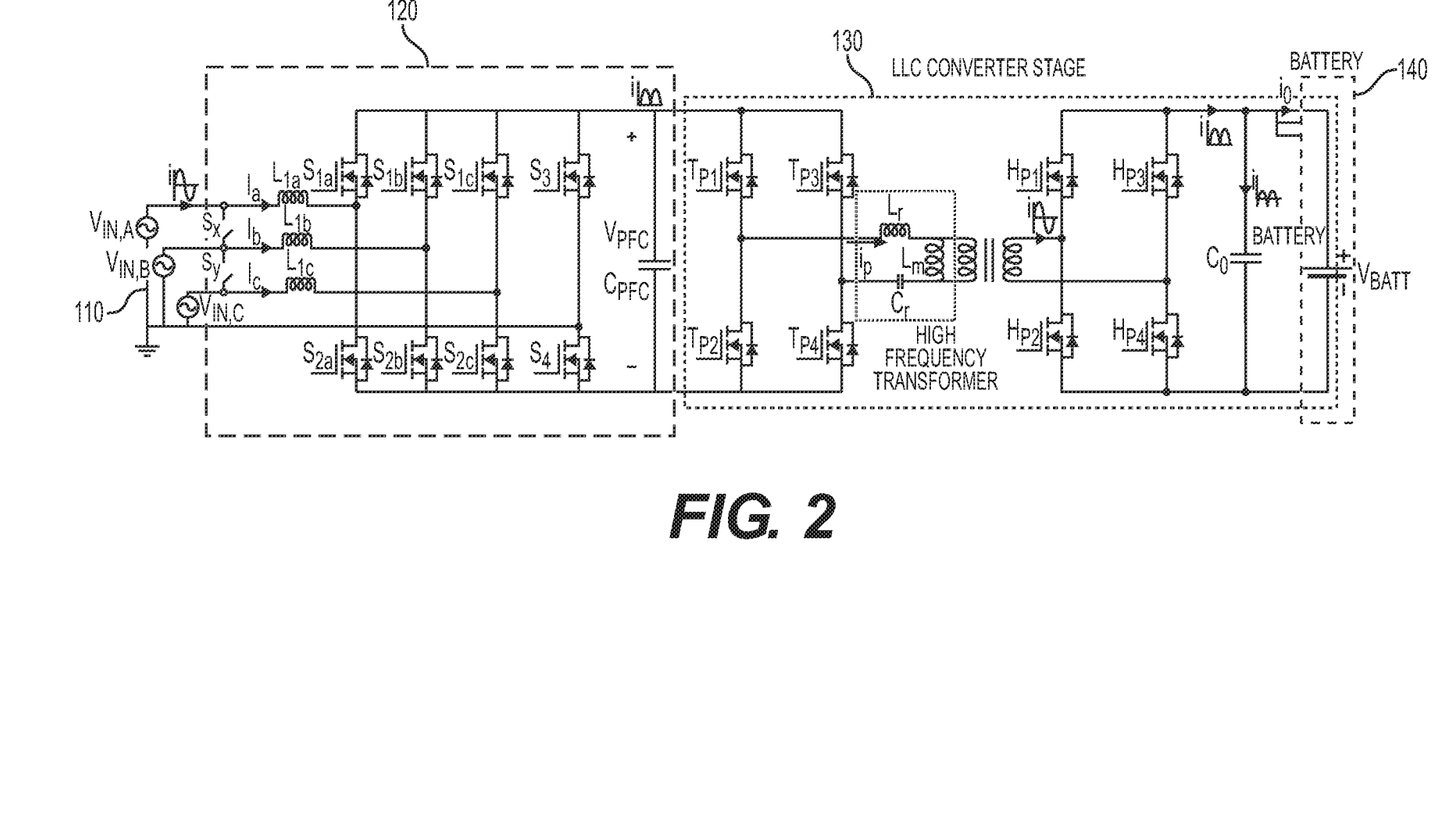
FIG. 2 depicts an exemplary electrical schematic for a universal input power supply bi-directional battery charger, according to one or more embodiments.

The PFC converter according to the disclosure may contain four legs of switches that may be operated with all types of input power supplies, and with universal input voltages. The input grid voltage may be sensed and the converter may be switched to operate in three-phase, two-phase, or single-phase operation. As shown in FIG. 2, for example, for three-phase operation, phase A, B, and C switch legs may be in operation and the neutral leg may be turned off. For single-phase operation, switches Sx and Sy may be switched to form an interleaved structure with three branches switching at 120 degrees. This control structure may provide wide variation in the PFC DC link voltage to attain a desired battery voltage. The converter may operate bidirectionally for a charging operation or a power supply operation. The converter may either receive power from an AC power source and provide DC power to a battery, or receive power from the battery and provide power as an AC power source. A vehicle to grid (V2G) operation may also be achieved with a designed control strategy for single-phase, two-phase, and three-phase systems. The switches may be any devices such as GTO, thyristors, or MOSFETs/IGBTs with series diodes, for example. These switches may also be mechanical components (such as relays or contactors) if sufficient failure rates and arcing conditions during operation are met.

For operation of the converter with a three-phase input power source, auxiliary switches Sx and Sy may be turned off along with the neutral leg. The controller may be designed with an algorithm to provide the desired DC link that is suitable for the DC-DC converter to charge the battery. The algorithm may be designed for both balanced and unbalanced power supplies to ensure the proper PFC operation is provided to charge the battery pack with reduced voltage and current ripple. The DC link may be varied from 600V to 900V, for example, to attain the desired output battery voltages.

In single phase operation, auxiliary switches Sx and Sy may be turned on to form an interleaved converter, and the converter may operate with the single phase power supply utilizing the full rated power. The switching pulses for S1a, S1b, and S1c may then be displaced by 120 degrees each, and the fourth leg with switches S3 and S4 may be in operation acting as return path for the current. The fourth leg switches S3 and S4 may be turned on and off based on the grid frequency (such as 50 Hz or 60 Hz, for example). The DC link in the single phase operation may be varied from 400 volts to 900 volts. The reference selection of the DC link may be made with regard to required output battery voltage.

Figure 1:
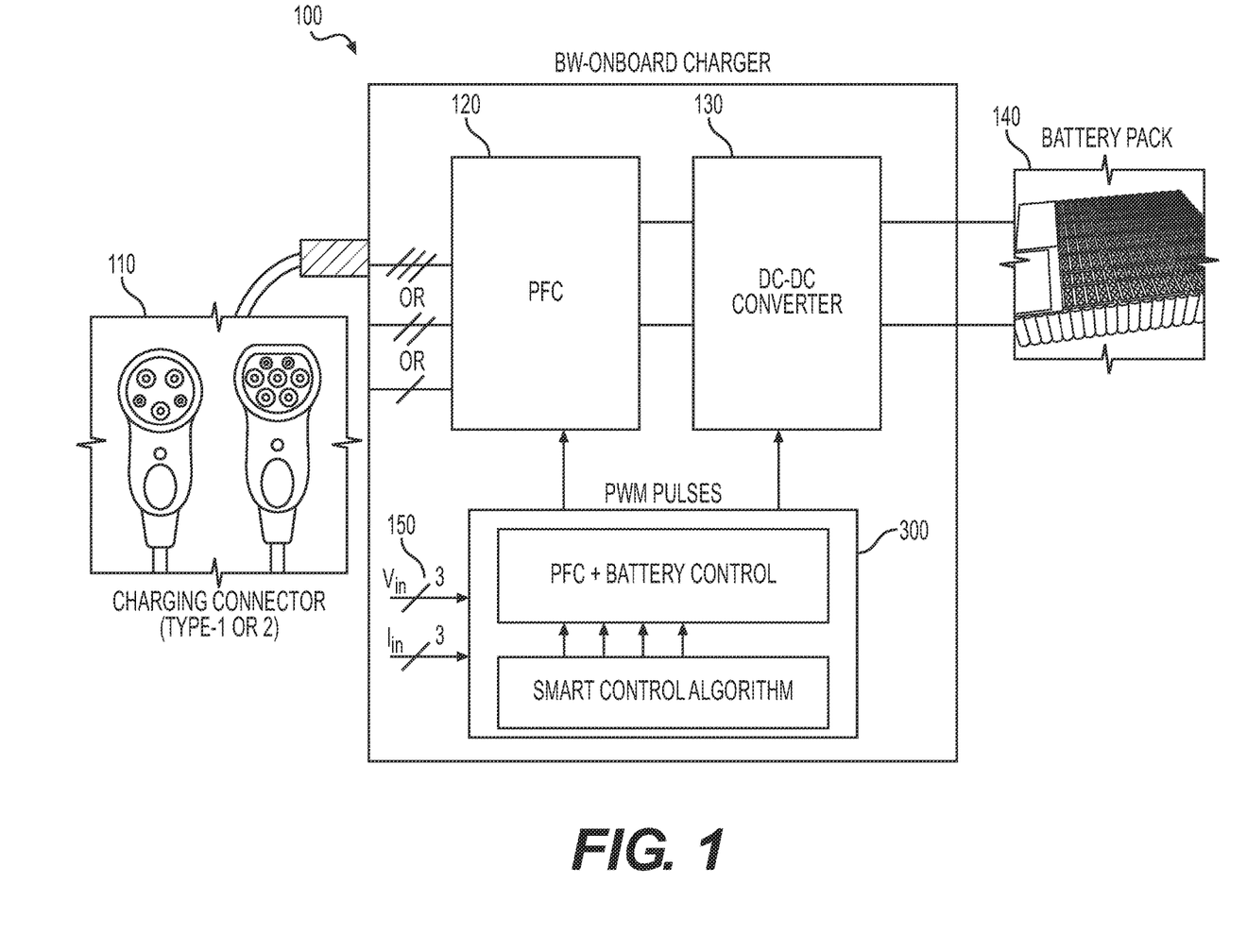
FIG. 1 depicts an exemplary system infrastructure for a universal input power supply bi-directional battery charger, according to one or more embodiments.

FIG. 1 depicts an exemplary system infrastructure for a universal input power supply bi-directional battery charger, according to one or more embodiments.

As shown in FIG. 1, a universal input power supply bi-directional battery charger 100 may include or be electrically connectable to a charging connector 110. The charging connector 110 may provide an electrical connection from an external power supply to the bi-directional battery charger 100, and may be a Type 1 or a Type 2 connector, for example. The charging connector 110 may transfer single phase, two-phase, or three phase power.

The bi-directional battery charger 100 may include a Power Factor Correction (PFC) converter 120, a DC-DC converter 130, and a controller 300. The bi-directional battery charger 100 may include or be electrically connectable to a battery 140. The bi-directional battery charger 100 may be used in automotive vehicles as an onboard charger to transfer power from an external power source through charging connector 110 to battery 140.

FIG. 2 depicts an exemplary electrical schematic for a universal input power supply bi-directional battery charger, according to one or more embodiments.

As shown in FIG. 2, the PFC converter 120 according to the disclosure may contain four legs of switches that may be operated with all types of input power supplies, and with universal input voltages. The four legs of switches may be provided as follows: phase A including switches S1a and S2a, phase B including switches S1b and S2b, phase C including switches S1c and S2c, and a neutral phase including switches S3 and S4. The input voltage from connector 110 may be sensed and the PFC converter 120 may be switched to operate in three-phase, two-phase, or single-phase operation.

PFC converter 120 may also include switches Sx and Sy respectively provided between phases A and B and between phases B and C from the connector 110. All switches described in the disclosure may be any devices such as GTO, thyristors, or MOSFETs/IGBTs with series diodes, for example. These switches may also be mechanical components (such as relays or contactors) if sufficient failure rates and arcing conditions during operation are met.

Additionally, PFC converter 120 may include inductors L1a, L2a, and L3a provided on phases A, B, and C, respectively between the switches Sx and Sy and the phase A, B, and C switches. Capacitor Cpfc may be provided as a DC link capacitor at an output of PFC converter 120 with a voltage Vpfc to an input of DC-DC converter 130.

DC-DC converter 130 may be any suitable converter operable to isolate the PFC converter 120 from battery 140. For example, DC-DC converter 130 may be an LLC converter as illustrated in FIG. 2, or may be a CLLLC converter.

The bi-directional battery charger 100 may be a system including PFC converter 120. PFC converter 120 may include a first (e.g. A) phase switch group (e.g. switches S1$a$ and S2$a$) connected to a first node from connector 110 to receive power from a first phase of a voltage source (e.g. Vin,a). The system may include a second (e.g. B) phase switch group (e.g. switches S1$b$ and S2$b$) connected to a second node from connector 110 to receive power from a second phase of a voltage source (e.g. Vin,b). The system may include a third (e.g. C) phase switch group (e.g. switches S1$c$ and S2$c$) connected to a third node from connector 110 to receive power from a third phase of a voltage source (e.g. Vin,c). The system may include a neutral phase switch group (e.g. S3 and S4) connected to a fourth node from connector 110 to be connected to a ground terminal of the voltage source.

PFC converter 120 may include a first switch (e.g. Sx) connected to the first node and the second node, and a second switch (e.g. Sy) connected to the second node and the third node.

PFC converter 120 may include an input sensor 150 configured to sense a voltage and/or a current of each phase of the voltage source. PFC converter 120 may include a controller 300 configured to, based on the sensed voltage and/or current from input sensor 150, determine a phase of the voltage source, and, based on the determined phase of the voltage source, control an operation of the first, second, third, and neutral phase switch groups (e.g. S1$a$ and S2$a$, S1$b$ and S2$b$, S1$c$ and S2$c$, and S3 and S4) and an operation of the first and second switches (e.g. Sx and Sy).

DC-DC converter 130 may be connected to outputs of the first, second, third, and neutral phase switch groups. A voltage source may be connected to one or more of the first, second, third, and fourth nodes of the PFC converter 120, and a battery 140 may be connected to an output of the DC-DC converter 130.

This control structure may provide wide variation in the PFC DC link voltage to attain a desired battery voltage. The battery charger 100 may operate bidirectionally. A vehicle to grid (V2G) operation may also be achieved with a designed control strategy for single-phase, two-phase, and three-phase systems. The PFC converter 14 may be configured to receive DC power from the battery 140 through the DC-DC converter 130, convert the DC power to AC power, and provide the AC power through one or more of the first, second, third, and fourth nodes. A requested voltage phase may include single-phase, two-phase, and three-phase operation. The controller 300 may be designed with an algorithm so that, based on the requested voltage phase, controller 300 may control an operation of the first, second, third, and neutral phase switch groups and an operation of the first and second switches to provide the AC power through the one or more of the first, second, third, and fourth nodes.

The controller 300 may be designed with and/or configured to run an algorithm for control of the first, second, third, neutral phase, and first and second (e.g. Sx and Sy) switches to provide a desired DC link voltage Vpfc that is suitable for the DC-DC converter 130 to charge the battery 140. The algorithm may be designed for both balanced and unbalanced power supplies to ensure the proper PFC operation is provided to charge the battery 140 with reduced voltage and current ripple. The DC link voltage may be variable, such as from 300V to 900V, for example, to attain the desired output voltage to battery 140.

Figure 3:
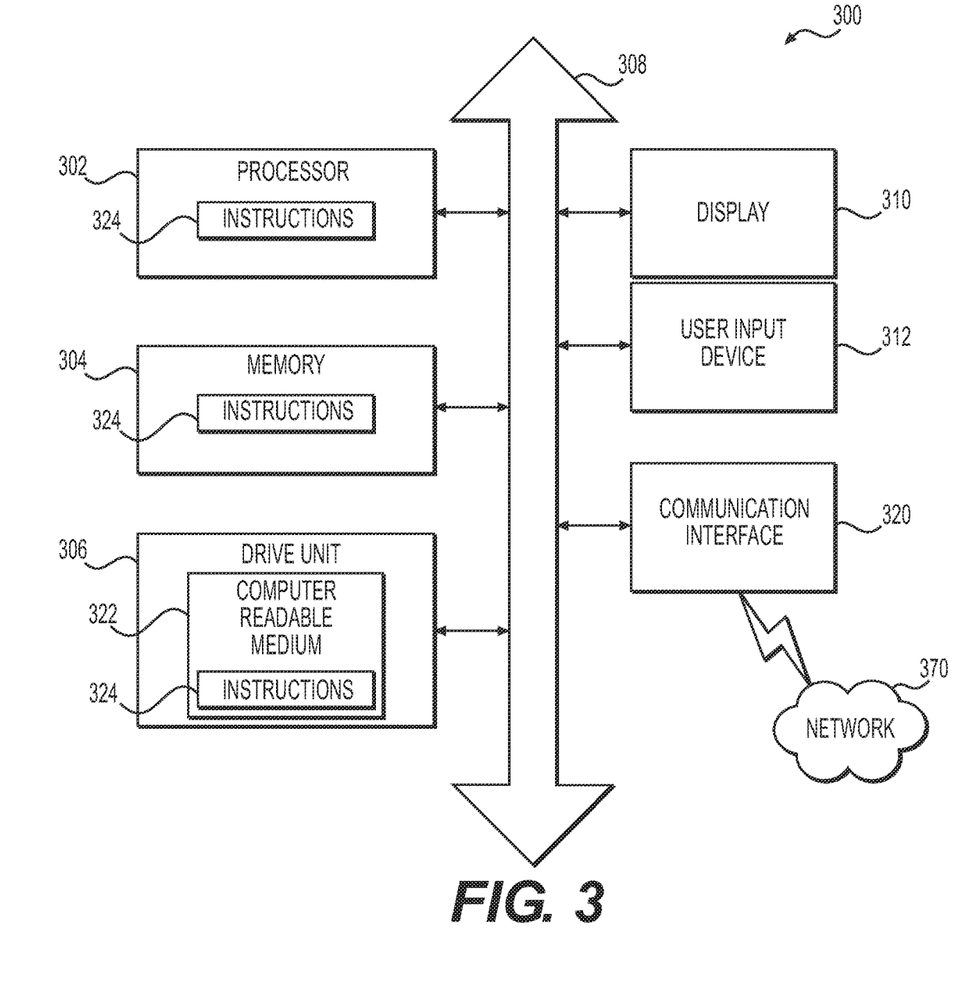
FIG. 3 depicts an implementation of a computer system that may execute techniques presented herein, according to one or more embodiments.

FIG. 3 depicts an implementation of a controller 300 that may execute techniques presented herein, according to one or more embodiments.

Any suitable system infrastructure may be put into place to allow control of the universal input power supply bi-directional battery charger. FIG. 3 and the following discussion provide a brief, general description of a suitable computing environment in which the present disclosure may be implemented. In one embodiment, any of the disclosed systems, methods, and/or graphical user interfaces may be executed by or implemented by a computing system consistent with or similar to that depicted in FIG. 3. Although not required, aspects of the present disclosure are described in the context of computer-executable instructions, such as routines executed by a data processing device, e.g., a server computer, wireless device, and/or personal computer. Those skilled in the relevant art will appreciate that aspects of the present disclosure can be practiced with other communications, data processing, or computer system configurations, including: Internet appliances, hand-held devices (including personal digital assistants ("PDAs")), wearable computers, all manner of cellular or mobile phones (including Voice over IP ("VoIP") phones), dumb terminals, media players, gaming devices, virtual reality devices, multi-processor systems, microprocessor-based or programmable consumer electronics, set-top boxes, network PCs, mini-computers, mainframe computers, and the like. Indeed, the terms "computer," "server," and the like, are generally used interchangeably herein, and refer to any of the above devices and systems, as well as any data processor.

Aspects of the present disclosure may be embodied in a special purpose computer and/or data processor that is specifically programmed, configured, and/or constructed to perform one or more of the computer-executable instructions explained in detail herein. While aspects of the present disclosure, such as certain functions, are described as being performed exclusively on a single device, the present disclosure may also be practiced in distributed environments where functions or modules are shared among disparate processing devices, which are linked through a communications network, such as a Local Area Network ("LAN"), Wide Area Network ("WAN"), and/or the Internet. Similarly, techniques presented herein as involving multiple devices may be implemented in a single device. In a distributed computing environment, program modules may be located in both local and/or remote memory storage devices.

Aspects of the present disclosure may be stored and/or distributed on non-transitory computer-readable media, including magnetically or optically readable computer discs, hard-wired or preprogrammed chips (e.g., EEPROM semiconductor chips), nanotechnology memory, biological memory, or other data storage media. Alternatively, computer implemented instructions, data structures, screen displays, and other data under aspects of the present disclosure may be distributed over the Internet and/or over other networks (including wireless networks), on a propagated signal on a propagation medium (e.g., an electromagnetic wave(s), a sound wave, etc.) over a period of time, and/or they may be provided on any analog or digital network (packet switched, circuit switched, or other scheme).

The controller 300 may include a set of instructions that can be executed to cause the controller 300 to perform any one or more of the methods or computer-based functions disclosed herein. The controller 300 may operate as a standalone device or may be connected, e.g., using a network, to other computer systems or peripheral devices.

In a networked deployment, the controller 300 may operate in the capacity of a server or as a client in a server-client user network environment, or as a peer computer system in a peer-to-peer (or distributed) network environment. The controller 300 can also be implemented as or incorporated into various devices, such as a personal computer (PC), a tablet PC, a set-top box (STB), a personal digital assistant (PDA), a mobile device, a palmtop computer, a laptop computer, a desktop computer, a communications device, a wireless telephone, a land-line telephone, a control system, a camera, a scanner, a facsimile machine, a printer, a pager, a personal trusted device, a web appliance, a network router, switch or bridge, or any other machine capable of executing a set of instructions (sequential or otherwise) that specify actions to be taken by that machine. In a particular implementation, the controller 300 can be implemented using electronic devices that provide voice, video, or data communication. Further, while the controller 300 is illustrated as a single system, the term "system" shall also be taken to include any collection of systems or sub-systems that individually or jointly execute a set, or multiple sets, of instructions to perform one or more computer functions.

As illustrated in FIG. 3, the controller 300 may include a processor 302, e.g., a central processing unit (CPU), a graphics processing unit (GPU), or both. The processor 302 may be a component in a variety of systems. For example, the processor 302 may be part of a standard computer. The processor 302 may be one or more general processors, digital signal processors, application specific integrated circuits, field programmable gate arrays, servers, networks, digital circuits, analog circuits, combinations thereof, or other now known or later developed devices for analyzing and processing data. The processor 302 may implement a software program, such as code generated manually (i.e., programmed).

The controller 300 may include a memory 304 that can communicate via a bus 308. The memory 304 may be a main memory, a static memory, or a dynamic memory. The memory 304 may include, but is not limited to computer readable storage media such as various types of volatile and non-volatile storage media, including but not limited to random access memory, read-only memory, programmable read-only memory, electrically programmable read-only memory, electrically erasable read-only memory, flash memory, magnetic tape or disk, optical media and the like. In one implementation, the memory 304 includes a cache or random-access memory for the processor 302. In alternative implementations, the memory 304 is separate from the processor 302, such as a cache memory of a processor, the system memory, or other memory. The memory 304 may be an external storage device or database for storing data. Examples include a hard drive, compact disc ("CD"), digital video disc ("DVD"), memory card, memory stick, floppy disc, universal serial bus ("USB") memory device, or any other device operative to store data. The memory 304 is operable to store instructions executable by the processor 302. The functions, acts or tasks illustrated in the figures or described herein may be performed by the processor 302 executing the instructions stored in the memory 304. The functions, acts or tasks are independent of the particular type of instructions set, storage media, processor or processing strategy and may be performed by software, hardware, integrated circuits, firm-ware, micro-code and the like, operating alone or in combination. Likewise, processing strategies may include multiprocessing, multitasking, parallel processing and the like.

As shown, the controller 300 may further include a display 310, such as a liquid crystal display (LCD), an organic light emitting diode (OLED), a flat panel display, a solid-state display, a cathode ray tube (CRT), a projector, a printer or other now known or later developed display device for outputting determined information. The display 310 may act as an interface for the user to see the functioning of the processor 302, or specifically as an interface with the software stored in the memory 304 or in the drive unit 306.

Additionally or alternatively, the controller 300 may include an input device 312 configured to allow a user to interact with any of the components of controller 300. The input device 312 may be a number pad, a keyboard, or a cursor control device, such as a mouse, or a joystick, touch screen display, remote control, or any other device operative to interact with the controller 300.

The controller 300 may also or alternatively include drive unit 306 implemented as a disk or optical drive. The drive unit 306 may include a computer-readable medium 322 in which one or more sets of instructions 324, e.g. software, can be embedded. Further, the instructions 324 may embody one or more of the methods or logic as described herein. The instructions 324 may reside completely or partially within the memory 304 and/or within the processor 302 during execution by the controller 300. The memory 304 and the processor 302 also may include computer-readable media as discussed above.

In some systems, a computer-readable medium 322 includes instructions 324 or receives and executes instructions 324 responsive to a propagated signal so that a device connected to a network 370 can communicate voice, video, audio, images, or any other data over the network 370. Further, the instructions 324 may be transmitted or received over the network 370 via a communication port or interface 320, and/or using a bus 308. The communication port or interface 320 may be a part of the processor 302 or may be a separate component. The communication port or interface 320 may be created in software or may be a physical connection in hardware. The communication port or interface 320 may be configured to connect with a network 370, external media, the display 310, or any other components in controller 300, or combinations thereof. The connection with the network 370 may be a physical connection, such as a wired Ethernet connection or may be established wirelessly as discussed below. Likewise, the additional connections with other components of the controller 300 may be physical connections or may be established wirelessly. The network 370 may alternatively be directly connected to a bus 308.

While the computer-readable medium 322 is shown to be a single medium, the term "computer-readable medium" may include a single medium or multiple media, such as a centralized or distributed database, and/or associated caches and servers that store one or more sets of instructions. The term "computer-readable medium" may also include any medium that is capable of storing, encoding, or carrying a set of instructions for execution by a processor or that cause a computer system to perform any one or more of the methods or operations disclosed herein. The computer-readable medium 322 may be non-transitory, and may be tangible.

The computer-readable medium 322 can include a solid-state memory such as a memory card or other package that houses one or more non-volatile read-only memories. The computer-readable medium 322 can be a random-access memory or other volatile re-writable memory. Additionally or alternatively, the computer-readable medium 322 can include a magneto-optical or optical medium, such as a disk or tapes or other storage device to capture carrier wave signals such as a signal communicated over a transmission medium. A digital file attachment to an e-mail or other self-contained information archive or set of archives may be considered a distribution medium that is a tangible storage medium. Accordingly, the disclosure is considered to include any one or more of a computer-readable medium or a distribution medium and other equivalents and successor media, in which data or instructions may be stored.

In an alternative implementation, dedicated hardware implementations, such as application specific integrated circuits, programmable logic arrays and other hardware devices, can be constructed to implement one or more of the methods described herein. Applications that may include the apparatus and systems of various implementations can broadly include a variety of electronic and computer systems. One or more implementations described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

The controller 300 may be connected to a network 370. The network 370 may define one or more networks including wired or wireless networks. The wireless network may be a cellular telephone network, an 802.11, 802.16, 802.20, or WiMAX network. Further, such networks may include a public network, such as the Internet, a private network, such as an intranet, or combinations thereof, and may utilize a variety of networking protocols now available or later developed including, but not limited to TCP/IP based networking protocols. The network 370 may include wide area networks (WAN), such as the Internet, local area networks (LAN), campus area networks, metropolitan area networks, a direct connection such as through a Universal Serial Bus (USB) port, or any other networks that may allow for data communication. The network 370 may be configured to couple one computing device to another computing device to enable communication of data between the devices. The network 370 may generally be enabled to employ any form of machine-readable media for communicating information from one device to another. The network 370 may include communication methods by which information may travel between computing devices. The network 370 may be divided into sub-networks. The sub-networks may allow access to all of the other components connected thereto or the sub-networks may restrict access between the components. The network 370 may be regarded as a public or private network connection and may include, for example, a virtual private network or an encryption or other security mechanism employed over the public Internet, or the like.

In accordance with various implementations of the present disclosure, the methods described herein may be implemented by software programs executable by a computer system. Further, in an exemplary, non-limited implementation, implementations can include distributed processing, component/object distributed processing, and parallel processing. Alternatively, virtual computer system processing can be constructed to implement one or more of the methods or functionality as described herein.

Although the present specification describes components and functions that may be implemented in particular implementations with reference to particular standards and protocols, the disclosure is not limited to such standards and protocols. For example, standards for Internet and other packet switched network transmission (e.g., TCP/IP, UDP/IP, HTML, HTTP) represent examples of the state of the art. Such standards are periodically superseded by faster or more efficient equivalents having essentially the same functions. Accordingly, replacement standards and protocols having the same or similar functions as those disclosed herein are considered equivalents thereof.

It will be understood that the steps of methods discussed are performed in one embodiment by an appropriate processor (or processors) of a processing (i.e., computer) system executing instructions (computer-readable code) stored in storage. It will also be understood that the disclosure is not limited to any particular implementation or programming technique and that the disclosure may be implemented using any appropriate techniques for implementing the functionality described herein. The disclosure is not limited to any particular programming language or operating system.

Figure 4:
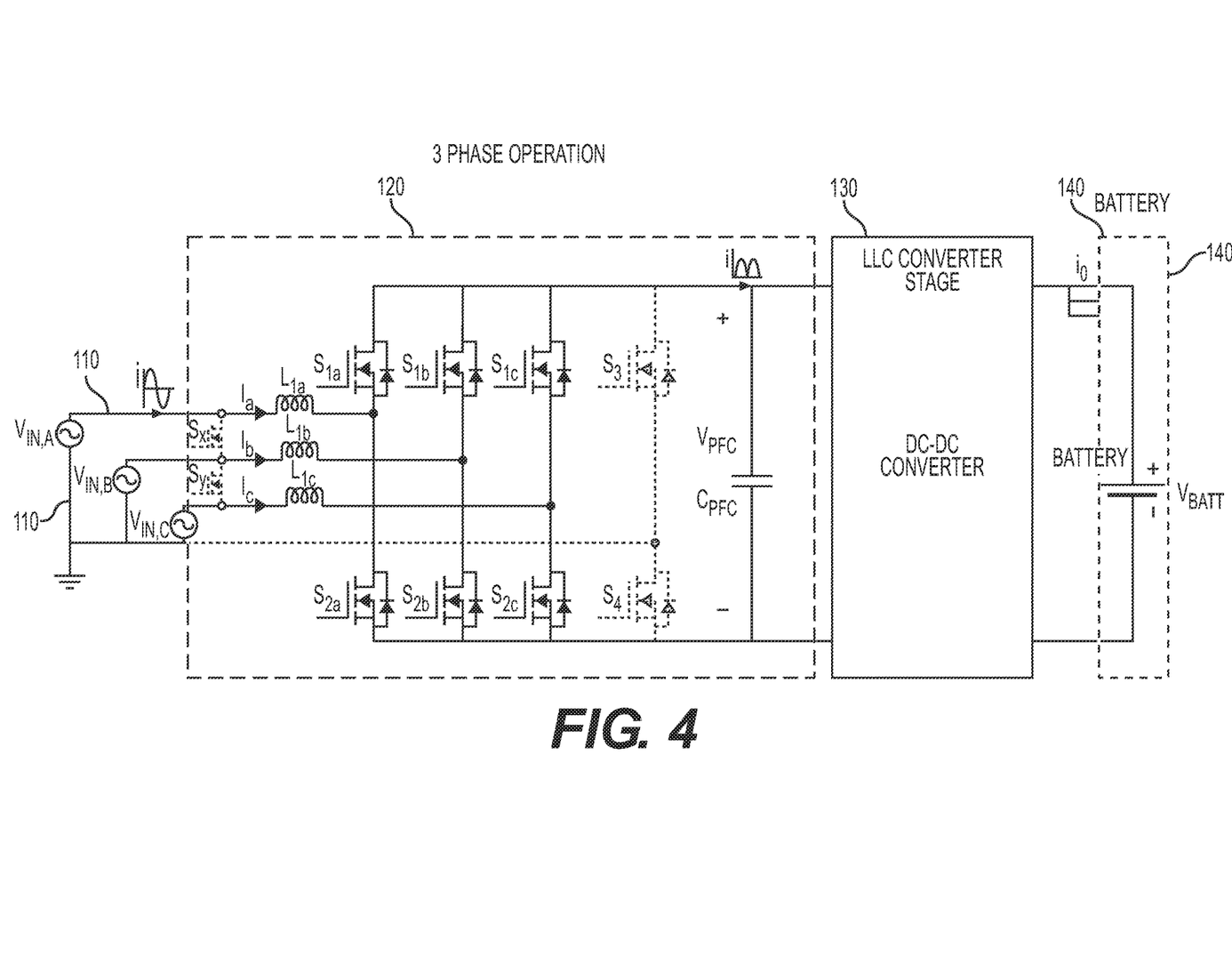
FIG. 4 depicts an exemplary electrical schematic for a universal input power supply bi-directional battery charger in a three phase operation, according to one or more embodiments.

FIG. 4 depicts an exemplary electrical schematic for a universal input power supply bi-directional battery charger in a three phase operation, according to one or more embodiments. The structure of universal input power supply bi-directional battery charger 100 is described above with reference to FIG. 2.

For three-phase operation of battery charger 100, phase A (S1*a* and S2*a*), B (S1*b* and S2*b*), and C (S1*c* and S2*c*) switch legs may be in operation, and the neutral leg (S3 and S4) may be turned off. Additionally, switches Sx and Sy are turned off.

Figure 5:
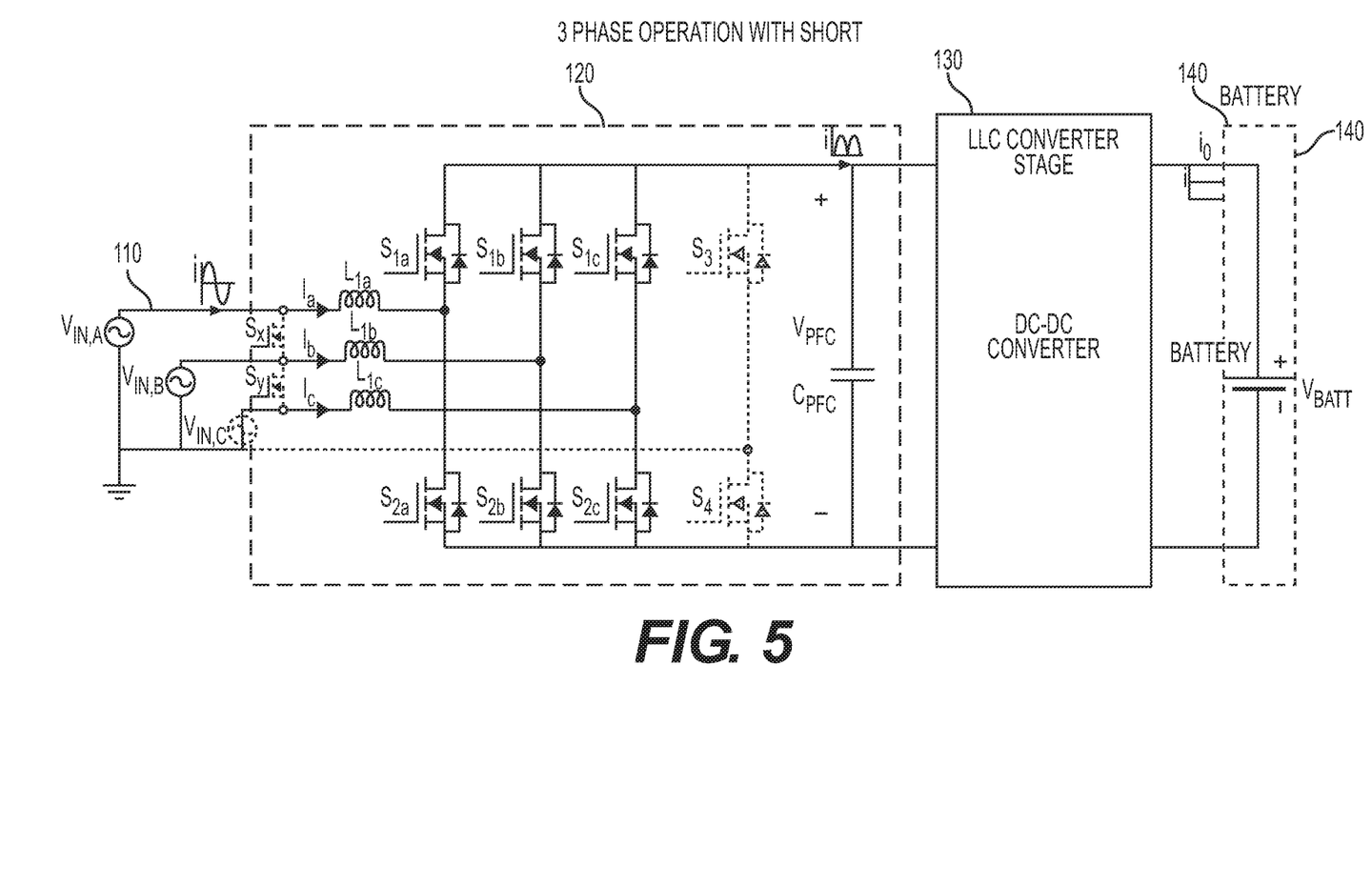
FIG. 5 depicts an exemplary electrical schematic for a universal input power supply bi-directional battery charger in an unbalanced three phase operation with one phase shorted, according to one or more embodiments.

FIG. 5 depicts an exemplary electrical schematic for a universal input power supply bi-directional battery charger in an unbalanced three phase operation with one phase shorted, according to one or more embodiments. The structure of universal input power supply bi-directional battery charger 100 is described above with reference to FIG. 2.

As discussed above, for three-phase operation of battery charger 100, phase A (S1*a* and S2*a*), B (S1*b* and S2*b*), and C (S1*c* and S2*c*) switch legs may be in operation, and the neutral leg (S3 and S4) may be turned off. Additionally, switches Sx and Sy are turned off. When phase C, for example of the voltage source is shorted, the operation may be described as a three-phase operation with a short.

Figure 6A:
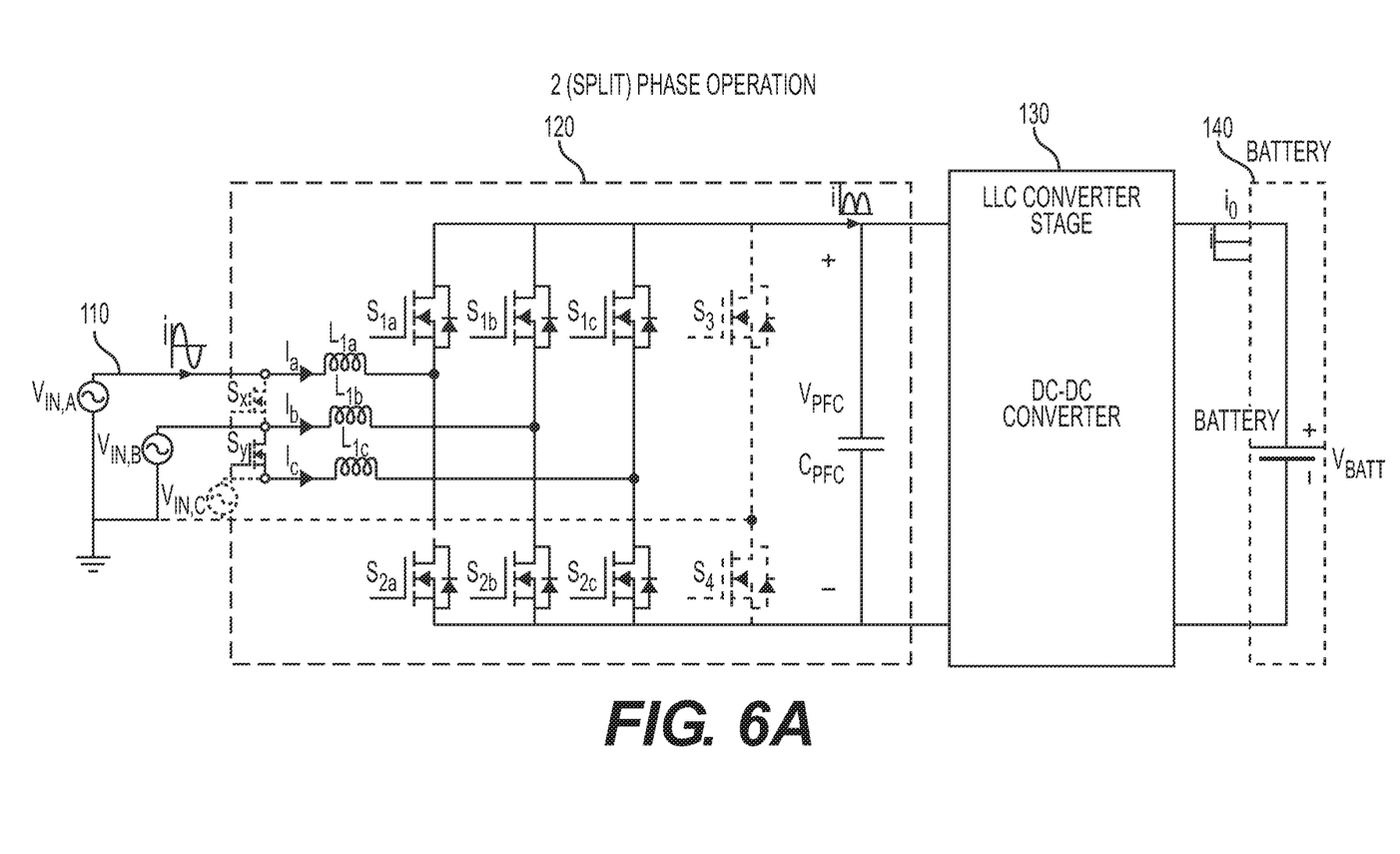
FIG. 6A depicts an exemplary electrical schematic for a universal input power supply bi-directional battery charger in a two, or split, phase operation, according to one or more embodiments.

FIG. 6A depicts an exemplary electrical schematic for a universal input power supply bi-directional battery charger in a two, or split, phase operation, according to one or more embodiments. The structure of universal input power supply bi-directional battery charger 100 is described above with reference to FIG. 2.

For two, or split, phase operation of battery charger 100, phase A (S1*a* and S2*a*), B (S1*b* and S2*b*), and C (S1*c* and S2*c*) switch legs may be in operation, and the neutral leg (S3 and S4) may be turned off. Additionally, switch Sx may be turned off and switch Sy may be turned on.

Figure 6B:
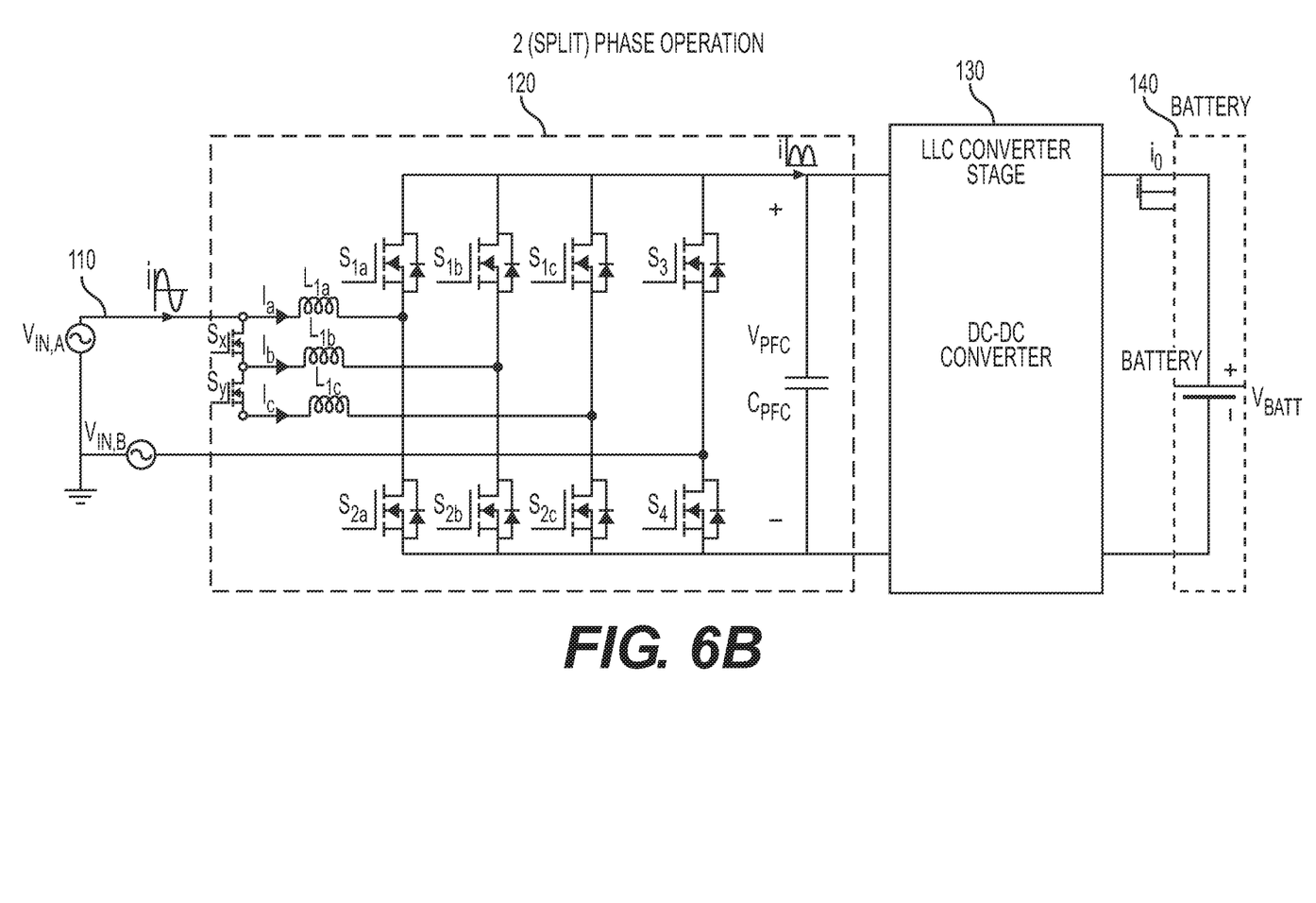
FIG. 6B depicts an exemplary electrical schematic for a universal input power supply bi-directional battery charger in a two, or split, phase operation, according to one or more embodiments.

FIG. 6B depicts an exemplary electrical schematic for a universal input power supply bi-directional battery charger in a two, or split, phase operation, according to one or more embodiments. The structure of universal input power supply bi-directional battery charger 100 is described above with reference to FIG. 2.

For two, or split, phase operation of battery charger 100, phase A (S1*a* and S2*a*), B (S1*b* and S2*b*), and C (S1*c* and S2*c*) switch legs may be in operation, and the neutral leg (S3 and S4) may be turned on. Additionally, switch Sx may be turned on and switch Sy may be turned on. The split phase operation may be configured as shown in FIG. 6A or FIG. 6B according to a voltage size and/or an arrangement of connections for power received from the voltage source through connector 110.

Figure 7:
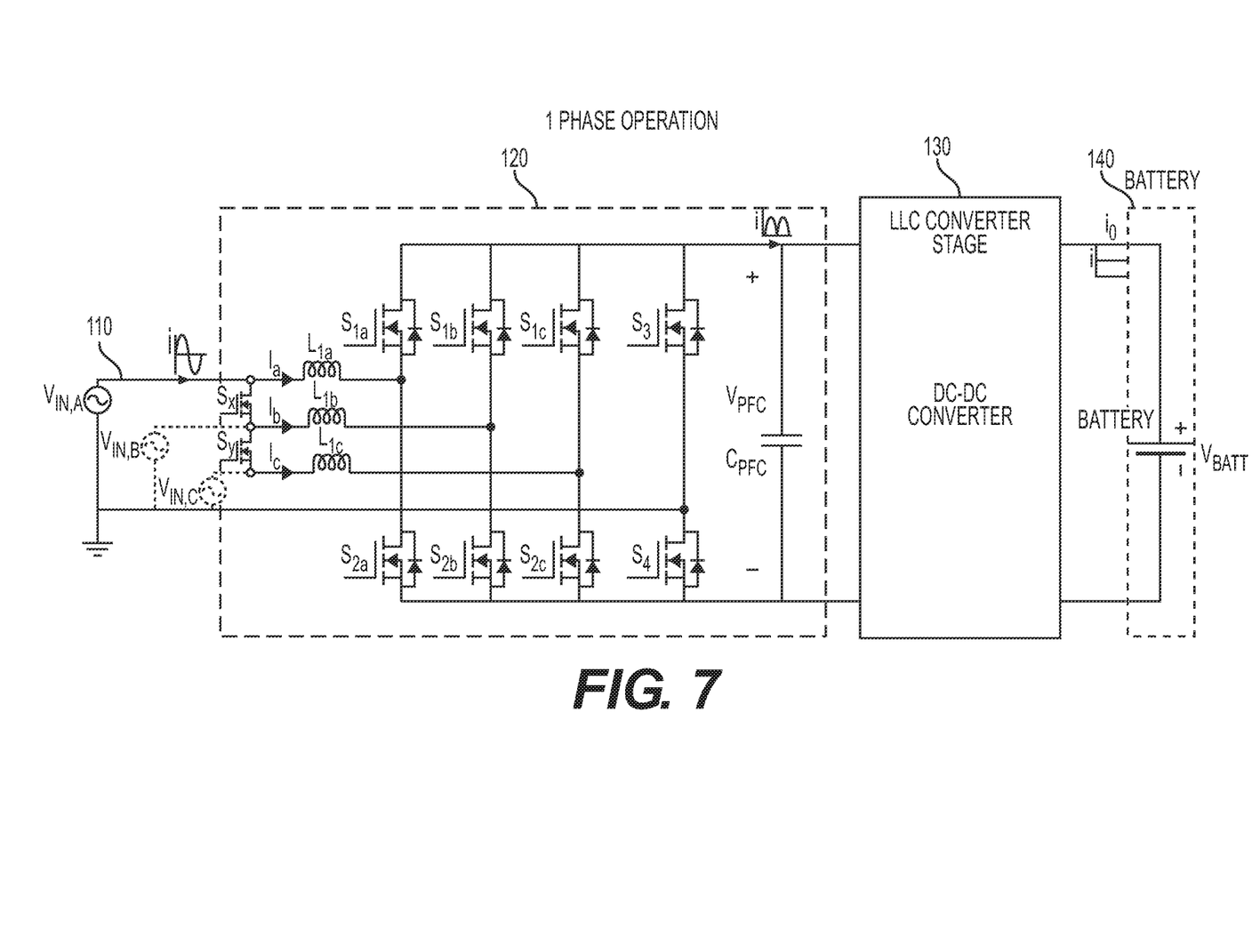
FIG. 7 depicts an exemplary electrical schematic for a universal input power supply bi-directional battery charger in a one, or single, phase operation, according to one or more embodiments.

FIG. 7 depicts an exemplary electrical schematic for a universal input power supply bi-directional battery charger in a one, or single, phase operation, according to one or more embodiments. The structure of universal input power supply bi-directional battery charger 100 is described above with reference to FIG. 2.

In single phase operation of battery charger 100, auxiliary switches Sx and Sy may be turned on to form an interleaved converter, and the converter may operate with the single phase power supply utilizing the full rated power. The switching pulses for S1$a$, S1$b$, and S1$c$ may then be displaced by 120 degrees each, and the fourth leg with switches S3 and S4 may be in operation acting as return path for the current. The fourth leg switches S3 and S4 may be turned on and off based on the grid frequency (such as 50 Hz or 60 Hz, for example). The controller 300 may control the operation of the first and second switches according to one or more of: turning the first switch Sx off and the second switch Sy off for ⅓ power, turning the first switch Sx on and the second switch Sy off for ⅔ power, or turning the first switch Sx on and the second switch Sy on for full power. The DC link voltage in the single phase operation may be variable, such as from approximately 300V to approximately 900V.

Figure 8:
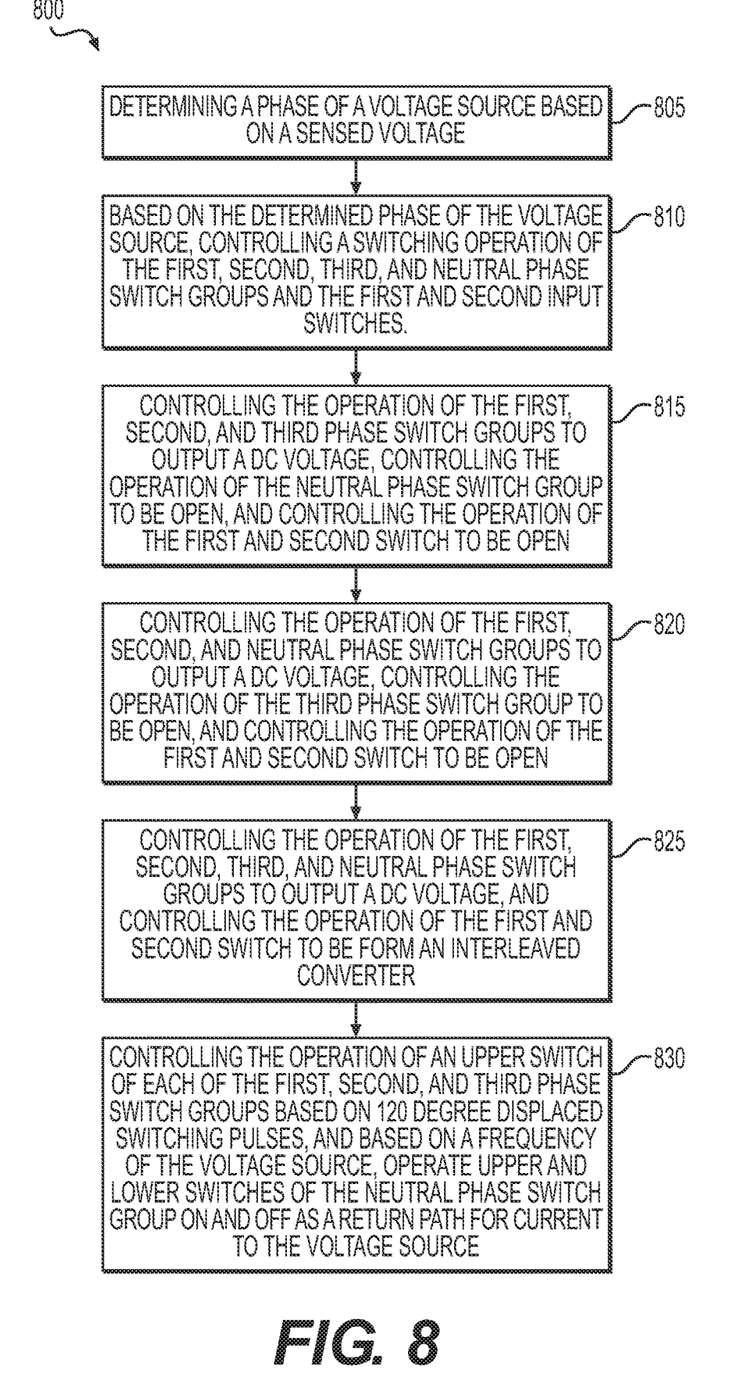
FIG. 8 depicts a flowchart of a method of operating the universal input power supply bi-directional battery charger, according to one or more embodiments.

FIG. 8 depicts a flowchart of a method 800 of operating the universal input power supply bi-directional battery charger, according to one or more embodiments.

Method 800 may control a system including PFC converter 120 and may include performing, by controller 300, various operations of method 800. Operation 805 may include determining a phase of a voltage source based on a sensed voltage from the voltage source, such as from input sensor 150, for example. Operation 810 may include, based on the determined phase of the voltage source, controlling a switching operation of the first, second, third, and neutral phase switch groups and the first and second input switches (auxiliary switches Sx and Sy) of the PFC converter 120.

When the determined phase of the voltage source is three phase voltage, operation 810 may include controlling the operation of the first, second, and third phase switch groups to output a DC voltage, controlling the operation of the neutral phase switch group to be open, and controlling the operation of the first and second switch to be open (operation 815).

When the determined phase of the voltage source is two phase voltage, operation 810 may include controlling the operation of the first, second, and third phase switch groups to output a DC voltage, controlling the operation of the neutral phase switch group to be open, and controlling the operation of the first switch to be open and the second switch to be closed, or controlling the operation of the first, second, and third phase switch groups to output a DC voltage, controlling the operation of the neutral phase switch group to be closed, and controlling the operation of the first switch to be closed and the second switch to be closed (operation 820).

When the determined phase of the voltage source is single phase voltage, operation 810 may include controlling the operation of the first, second, third, and neutral phase switch groups to output a DC voltage, and controlling the operation of the first and second switch to be form an interleaved converter (operation 825).

When the determined phase of the voltage source is single phase voltage, operation 810 may further include controlling the operation of an upper switch of each of the first, second, and third phase switch groups based on 120 degree displaced switching pulses, and based on a frequency of the voltage source, operate upper and lower switches of the neutral phase switch group on and off as a return path for current to the voltage source (operation 830).

Other embodiments of the disclosure will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A system for an alternating current (AC) to direct current (DC) Power Factor Correction (PFC) converter, the system comprising:
   a first phase switch group connected to a first node to receive power from a first phase of a voltage source;
   a second phase switch group connected to a second node to receive power from a second phase of the voltage source;
   a third phase switch group connected to a third node to receive power from a third phase of the voltage source;
   a neutral phase switch group connected to a fourth node to be connected to a ground terminal of the voltage source;
   a first switch connected to the first node and the second node;
   a second switch connected to the second node and the third node;
   an input voltage sensor configured to sense a voltage of each phase of the voltage source; and
   a controller configured to:
     based on the sensed voltage, determine a phase of the voltage source, and
     based on the determined phase of the voltage source, control an operation of the first, second, third, and neutral phase switch groups and an operation of the first and second switches.

2. The system of claim 1, wherein when the determined phase of the voltage source is three phase voltage, the controller is configured to:
   control the operation of the first, second, and third phase switch groups to output a DC voltage,
   control the operation of the neutral phase switch group to be open, and
   control the operation of the first and second switch to be open.

3. The system of claim 1, wherein when the determined phase of the voltage source is two phase voltage, the controller is configured to:
   control the operation of the first, second, and third phase switch groups to output a DC voltage, control the operation of the neutral phase switch group to be open, and control the operation of the first switch to be open and the second switch to be closed, or
   control the operation of the first, second, and third phase switch groups to output a DC voltage, control the operation of the neutral phase switch group to be closed, and control the operation of the first switch to be closed and the second switch to be closed.

4. The system of claim 1, wherein when the determined phase of the voltage source is single phase voltage, the controller is configured to:
   control the operation of the first, second, third, and neutral phase switch groups to output a DC voltage, and
   control the operation of the first and second switch to form an interleaved converter.

5. The system of claim 4, wherein the controller is configured to:

control the operation of an upper switch of each of the first, second, and third phase switch groups based on 120 degree displaced switching pulses, and based on a frequency of the voltage source, operate upper and lower switches of the neutral phase switch group on and off as a return path for current to the voltage source.

6. The system of claim 4, wherein the controller is configured to control the operation of the first and second switches according to one or more of:

turning the first switch off and the second switch off for ⅓ power, turning the first switch on and the second switch off for ⅔ power, or turning the first switch on and the second switch on for full power.

7. A system for an alternating current (AC) to direct current (DC) Power Factor Correction (PFC) converter, the system comprising:

a first phase switch group connected to a first node to receive power from a first phase of a voltage source;

a second phase switch group connected to a second node to receive power from a second phase of the voltage source;

a third phase switch group connected to a third node to receive power from a third phase of the voltage source;

a neutral phase switch group connected to a fourth node to be connected to a ground terminal of the voltage source;

a first switch connected to the first node and the second node;

a second switch connected to the second node and the third node; and an LLC converter connected to outputs of the first, second, third, and neutral phase switch groups.

8. The system of claim 7, further comprising a DC link capacitor provided in parallel with the first, second, third, and neutral phase switch groups and the LLC converter.

9. The system of claim 7, wherein the PFC converter is configured to output DC power from approximately 300V to approximately 900V.

10. The system of claim 7, further comprising:

the voltage source connected to one or more of the first, second, third, and fourth nodes of the PFC converter; and a battery connected to an output of the LLC converter.

11. The system of claim 10, wherein the PFC converter is further configured to receive DC power from the battery through the LLC converter, convert the DC power to AC power, and provide the AC power through one or more of the first, second, third, and fourth nodes.

12. The system of claim 11, further comprising a controller configured to:

based on a requested voltage phase, control an operation of the first, second, third, and neutral phase switch groups and an operation of the first and second switches to provide the AC power through the one or more of the first, second, third, and fourth nodes.

13. The system of claim 12, wherein the requested voltage phase includes single-phase, two-phase, and three-phase operation.

14. A method for controlling a system including an alternating current (AC) to direct current (DC) Power Factor Correction (PFC) converter including first, second, third, and neutral phase switch groups and first and second input switches configured to switch power to the first, second, and third switch groups, the method comprising performing, by at least one processor, operations including:

determining a sensed voltage of each phase of a voltage source using an input voltage sensor;

determining a phase of the voltage source based on the sensed voltage; and based on the determined phase of the voltage source, controlling a switching operation of the first, second, third, and neutral phase switch groups and the first and second input switches of the PFC converter.

15. The method of claim 14, wherein when the determined phase of the voltage source is three phase voltage, the controlling the switching operation includes:

controlling the operation of the first, second, and third phase switch groups to output a DC voltage, controlling the operation of the neutral phase switch group to be open, and controlling the operation of the first and second switch to be open.

16. The method of claim 14, wherein when the determined phase of the voltage source is two phase voltage, the controlling the switching operation includes:

controlling the operation of the first, second, and third phase switch groups to output a DC voltage, controlling the operation of the neutral phase switch group to be open, and controlling the operation of the first switch to be open and the second switch to be closed, or controlling the operation of the first, second, and third phase switch groups to output a DC voltage, controlling the operation of the neutral phase switch group to be closed, and controlling the operation of the first switch to be closed and the second switch to be closed.

17. The method of claim 14, wherein when the determined phase of the voltage source is single phase voltage, the controlling the switching operation includes:

controlling the operation of the first, second, third, and neutral phase switch groups to output a DC voltage, and controlling the operation of the first and second switch to be form an interleaved converter.

18. The method of claim 17, wherein the controlling the switching operation further includes:

controlling the operation of an upper switch of each of the first, second, and third phase switch groups based on 120 degree displaced switching pulses, and based on a frequency of the voltage source, operate upper and lower switches of the neutral phase switch group on and off as a return path for current to the voltage source.

19. A non-transitory computer readable medium storing instructions that, when executed by at least one processor, perform operations including:

determininq a sensed voltage of each phase of a voltage source using an input voltage sensor;

determining a phase of the voltage source based on the sensed voltage; and based on the determined phase of the voltage source, controlling a switching operation of first, second, third, and neutral phase switch groups of an alternating current (AC) to direct current (DC) Power Factor Correction (PFC) converter and first and second input switches of the PFC converter configured to switch power to the first, second, and third switch groups.

* * * * *

UNITED STATES PATENT AND TRADEMARK OFFICE
CERTIFICATE OF CORRECTION

| | | |
|---|---|---|
| PATENT NO. | : 12,280,684 B2 | Page 1 of 1 |
| APPLICATION NO. | : 17/648369 | |
| DATED | : April 22, 2025 | |
| INVENTOR(S) | : Venkata Jaya Sai Praneeth Ammanamanchi et al. | |

It is certified that error appears in the above-identified patent and that said Letters Patent is hereby corrected as shown below:

In the Claims
Column 16, Line 54, in Claim 19, delete "determininq" and insert --determining--.

Signed and Sealed this
Tenth Day of June, 2025

Coke Morgan Stewart
*Acting Director of the United States Patent and Trademark Office*